United States Patent [19]

Lundin et al.

[11] Patent Number: 4,521,314

[45] Date of Patent: Jun. 4, 1985

[54] METHOD AND DEVICE FOR FILTERING YEAST AND OTHER PLANT CELL MATERIAL ON ROTARY VACUUM FILTER

[76] Inventors: Per O. Lundin, Sewell's Farm, Barcombe, Lewes, England; Sven Eriksson, Mariekällgatan 14, 151 32 Södertälje; Ingvar Lundin, Sommarvägen 5, 191 70 Sollentuna, both of Sweden

[21] Appl. No.: 361,907

[22] PCT Filed: Jul. 22, 1981

[86] PCT No.: PCT/SE81/00222

§ 371 Date: Mar. 16, 1982

§ 102(e) Date: Mar. 16, 1982

[87] PCT Pub. No.: WO82/00418

PCT Pub. Date: Feb. 18, 1982

[30] Foreign Application Priority Data

Jul. 25, 1980 [SE] Sweden ................................. 8005381

[51] Int. Cl.³ ............................................... B01D 37/02
[52] U.S. Cl. ..................... 210/777; 210/396; 210/397; 210/402; 210/784; 162/259
[58] Field of Search ............... 210/784, 791, 396, 897, 210/402, 407, 777, 408, 392, 104, 122; 162/329, 323, 281, 208, 259

[56] References Cited

U.S. PATENT DOCUMENTS

| | | | |
|---|---|---|---|
| 617,367 | 1/1899 | Solvay | 210/396 |
| 2,306,074 | 12/1942 | Meyer | 210/396 |
| 2,444,466 | 7/1948 | Peterson | 162/329 |
| 3,772,144 | 11/1973 | Luthi et al. | 162/329 |
| 3,869,389 | 3/1975 | Rokitansky | 210/396 |
| 3,919,088 | 11/1975 | Doncer et al. | 210/402 |

FOREIGN PATENT DOCUMENTS 1279562  1/1968  Fed. Rep. of Germany ...... 210/402

Primary Examiner—Richard V. Fisher
Assistant Examiner—Sharon T. Cohen
Attorney, Agent, or Firm—LeBlanc, Nolan, Shur & Nies

[57] ABSTRACT

A method and device for filtering a suspension (14), for example of yeast or other plant cell material, on a rotary vacuum filter (10), beneath which a trough (4) containing the suspension (14) is located. In order to improve the balance between dipping zone and drying zone, according to the invention a take-off knife (1) for taking off the filter cake (8) resulting from the filtering is attached to the trough (4). The level of the suspension (14) is maintained constant, and the trough (4) is moved by means of a feeding device (7) to the center of the drum (12) of the vacuum filter (10) while the drum is rotating.

8 Claims, 2 Drawing Figures

U.S. Patent  Jun. 4, 1985  4,521,314
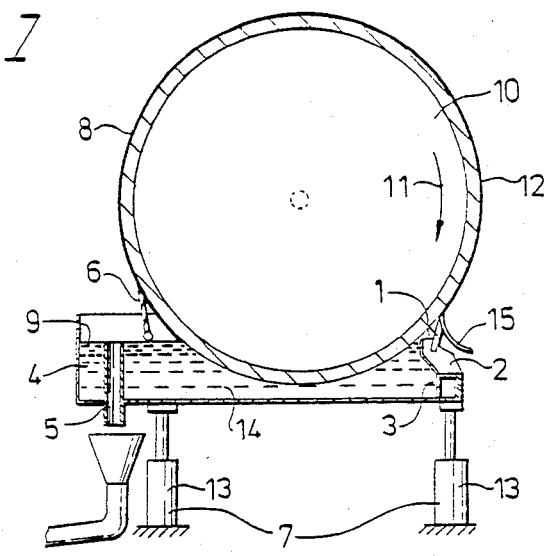
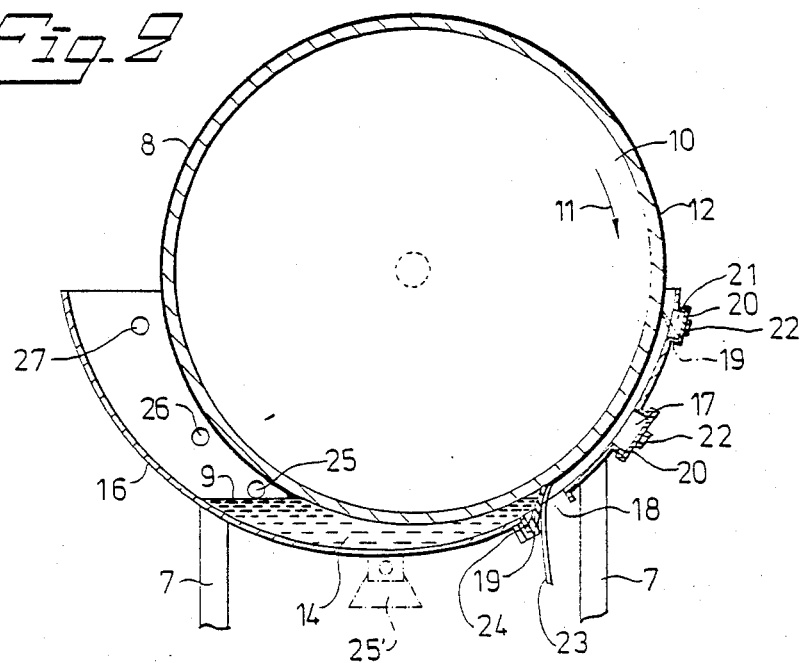

METHOD AND DEVICE FOR FILTERING YEAST AND OTHER PLANT CELL MATERIAL ON ROTARY VACUUM FILTER

This invention relates to a method and device for use at the filtering of a suspension, for example bakery yeast mixed with common salt (NaCl) or other active electrolyte according to the cytorrhysis method or at the filtering of other plant cell material with or without salt.

At such method, first the rotary drum filter is precoated with filter auxiliary, so-called precoat, for example starch. The filtering of, for example, the yeast suspension mixed with electrolyte is carried out from a trough located below the lowermost point of the rotary filter drum. The washing of the salt out of the filter cake is effected in known manner and the filter cake formed at the filtering process is taken off by a take-off knife.

Examples of the known art in the field with respect to filters here concerned are the so-called Lundin filter or the so-called rapid filter with bottom trough, which are marketed by AB Alfa Laval, Sweden.

Very small changes in the concentration, composition or properties of a product require the most varying contact times between filter surface and suspension in order to obtain a filtering result which is optimum. For this reason, the filtering results with the present filters rarely are at optimum, because the filters in most cases are adjusted at optimum to only one product. The required variation in contact time between the suspension and the active filter surface can vary between a dipping angle of 180°, i.e. where half the drum is dipped into the suspension, for example at the filtering of must in winecellars, and a dipping angle of 1°–2°, for example at the filtering of sediments in yeast in wine-cellars and breweries. This implies that the ratio between dipping zone and drying zone in the first-mentioned case amounts to 1:1 and in the latter case to the magnitude 1:250.

When the suspension level in the trough at conventional bottom trough filters is lowered in order to reduce the contact time, and the take-off knife remains in its original position, a corresponding part of the active filter surface is lost and simultaneously arises there air leakage. The result, this, is reduced filtering capacity. When, instead, the level in the trough is raised, this yields optimum filtering capacity for a very limited number of suspensions. For the majority of suspensions, for example in the ferment industry, the resulting long contact time between filter surface and suspension cannot be utilized for cake formation. The result is also in this case a substantially reduced filtering capacity.

Most of the existing rotary vacuum filters, thus, show the weakness that it is difficult to achieve good balance between coating zone and drying zone, i.e. between the drum portion where cake formation takes place, and the drum portion where the filter cake achieves by degrees maximum dry content.

A problem associated therewith is, that at a trough adjusted to a certain suspension said balance is changed during the filtering process, because the knife is moved relative to the trough and the suspension level.

The present invention solves this problem and offers advantages also in other respects, as will appear from below. The present invention, thus, relates to a method at the filtering of a suspension, for example yeast or other plant cell material on a rotary vacuum filter, beneath which a trough containing the suspension is located. The invention is characterized in that a take-off knife for the filter cake produced by the filtering process is attached to the trough, and the suspension level in the trough is held constant, and that at least the trough portion carrying the take-off knife is moved by a feeding device to the centre of the filter drum while the drum is being rotated.

The invention, further, relates to a device of the kind and having the main characterizing features as defined in claim 5.

The invention is described in greater detail in the following, with reference to the accompanying drawings, in which FIG. 1 shows schematically, partially by vertical section, a device where the invention according to a first embodiment thereof is applied, FIG. 2 is a vertical section corresponding to the one shown in FIG. 1 according to a second embodiment of the invention.

In FIG. 1 a rotary vacuum filter 10 is shown capable to rotate in the direction indicated by the arrow 11. Beneath the drum 12 a trough 4 is located. This is a conventional design of a rotary vacuum filter. At the forward end 3 of the trough 4, according to a first embodiment, a take-off knife 1 is ridigly attached to a holder 2 at the trough 4. Preferably at the rear end of the trough an equalizing doctor 6 is ridigly attached, the object of which is control of the thickness of the filter cake 8 in order to obtain efficient washing-out of salt, which is supplied, for example, in a yeast concentrate.

The equalizing doctor is of an elastic material, for example rubber, Vulcan ®, Tricolan ®.

The trough is supported on a feeding device 7 comprising hydraulic or pneumatic cylinders 13 or screw spindles or corresponding lifting means.

The trough 4 occupies from its forward to its rearward edge normally an angle of about 40°–60° of the circumference of the filter drum in FIG. 1. The trough, however, may be designed greater or smaller for yielding greater or smaller dipping angles, i.e. the angles at which contact prevails between filter surface and suspension.

According to a first embodiment of the present invention, thus, the forward edge 3 of the trough 4 is equipped with a take-off knife 1 for the filter cake 8. The knife constitutes an inherent part of the trough.

The feeding device 7 is capable during the filtering process to continuously move the trough 4, which contains the suspension 14 mixed with electrolyte, in the direction to the drum centre, i.e. straight upward in FIG. 1.

Simultaneously with the movement of the trough 4, the take-off knife 1 ridigly attached in the trough 4 for taking off the filtered cake 15 and, when provided, the equalizing doctor 6 are moved upward through the pre-coat layer, which thereby during the rotation of the drum 12 is de-scaled in a thin layer together with the filter cake. The liquid level in the trough is maintained constant, preferably by a spillway 5.

Said level is maintained a short distance below the level of the take-off knife, as appears from FIG. 1.

Owing to the constant level of the suspension in the trough, together with the upward movement of the trough, the dipping angle remains constant during the upward movement of the trough, irrespective of the thickness of the pre-coat layer.

The suspension, thus, is supplied immediately behind the knife 1. The filter drum 12 is hereby coated with filter cake 8 about all of its circumference, except for the short portion thereof which is located between the knife 1 and the surface 9 of the suspension. This short portion generally should be about 20 to 50 mm.

At this embodiment the trough 4 is adjusted to optimum dipping angle which, thus, is constant during the entire filtering operation.

The filtering is hereby extremely efficient.

However, as mentioned above in the introductory part, the dipping angle varies for different suspensions, so that different troughs must be available which render possible dipping angles from 180° to 1°-2°, depending on the suspension.

According to a second embodiment of the invention, which is intended primarily for small installations, in which small quantities of suspensions with different filtering properties are to be filtered, a possibility of rapidly changing the dipping angle with one and the same trough is provided.

In FIG. 2 such a trough 16 is shown, the depth of which is sufficient for rendering possible such maximum dipping angles which possibly may be required. The trough 16 according to this embodiment is provided with one or more apertures or slits 17,18,21 in the trough bottom at the level, at which the dipping angles in question are obtained. In the slits 17,18,21 a take-off knife 19 is prepared to be located. FIG. 3 shows by fully drawn lines the knife 19 located farther down on the trough, and by dashed lines a knife location corresponding to that shown in FIG. 1 is indicated. Of course, only one take-off knife 19 at a time is used, and cover means 20 or corresponding means are provided to sealingly close by suitable fastening members 22 the slits 17,21 in which the take-off knife 19 is not located.

The take-off knife 19, thus, is attached upright from the bottom of the trough 4 when a dipping angle smaller than the maximum one is desired.

The trough also at this embodiment is supported on the feeding device 7 shown in FIG. 1 which advances the trough upward to the drum centre. Irrespective of the location of the take-off knife 19, the suspension level in the trough is maintained a short distance below the take-off knife 19.

For maintaining the suspension level constant, a spillway 25,26,27 can be provided for each respective knife location.

One of said spillways 25,26,27 which corresponds to the knife position in question is connected, while the remaining two spillways are closed.

The filter cake 23 taken off by the take-off knife 19 is discharged through the aperture 18 in question immediately before the knife 19, seen in the direction of movement of the drum 12. The apertures 17,18, 21, thus, have a size sufficient for such discharge. The take-off knife 19, further, extends all along or substantially all along the axial length of the drum 12 and is sealed by sealing means (not shown) to the sides of the trough 16, so that the suspension 14 is prevented from passing the knife 19 to the right in FIG. 2.

The knife 19 is attached in a slit 18 by suitable fastening members 24, in or against which the knife 19 is fixed.

At the discharge of the scaled-off filter cake also parts of the precoat layer follow along.

By this embodiment, thus, one and the same installation can easily be adjusted to a suspension in question, which is filtered with the dipping angle being constant, irrespective of the position in which the take-off knife is located.

According to both embodiments of the invention, the dipping angle is adjusted prior to the filtering operation, in that the distance of the trough 4 to the drum is adjusted by the feeding device 7.

By means of the present invention, thus, good balance between coating zone and drying zone is maintained during the entire filtering process, because the dipping angle remains constant.

A furher advantage provided by the present invention is the reduction of pre-coat consumption, because substantially the entire circumference of the drum is utilized.

At the embodiment described above, the feeding device 7 can be designed so as to move the trough 4 in parallel upward or to move the trough while inclining it slightly. According to a modified embodiment, however, the trough 4 is mounted pivotally by means of a bearing arrangement 25, which is shown by dashed lines in FIG. 2 and located between the lower surface of the trough and the support. The feeding device, which comprises members corresponding to those described above, is located in a point along the trough spaced from the bearing arrangement. The bearing arrangement, for example, may be located at the lowermost and, respectively, central point of the trough, or to the left thereof, in FIG. 2 and, respectively, FIG. 1. The feeding device here comprises only its right-hand portion 7,13 in FIGS. 1 and 2.

When the trough above and in the claims is stated to be moved to the centre of the drum, this refers, thus, at least to that trough portion, at which the take-off knife 1,19 is located. The movement, of course, is not restricted to take place entirely radially to the drum centre.

The present invention, thus, in a simple and inexpensive way solves the problem referred to above in the introductory part.

Several modifications of the invention, of course, can be imagined without abandoning the idea of the invention. The attachment of the take-off knife to or in the trough, for example, can be varied in ways obvious to the expert, and also the feeding device can be designed in a way other than shown at the embodiments.

The invention, thus, is not to be regarded restricted to the embodiments described above, but can be varied within the scope of the attached claims.

We claim:

1. A method for filtering a suspension, for example of yeast or other plant cell material, on a rotary vacuum filter (10), beneath which a trough (4) containing the suspension (14) is located, characterized in that, in this combination, a take-off knife (1,19) for descaling the filter cake (8) resulting from the filtering together with a thin layer of a precoat layer is secured on the trough (4); maintaining the level (9) of the suspension (14) in the trough (4) constant a small distance below the take-off knife whereby only a small peripheral portion of the drum is not used for dipping or drying, and moving at least that portion of the trough (4) which carries the take-off knife (1, 19) by means of a feeding device (7) toward the centre of the drum (12) of the vacuum filter (10) during filtration and while the drum (12) is rotating, to thereby provide a successive thin layer descaling of the precoat and obtain a constant dipping angle during filtration.

2. A method as defined in claim 1, characterized in that the take-off knife (1,19) is secured ajacent one upper edge of the trough (4) when a maximum dipping angle obtainable with the trough is desired.

3. A method as defined in claim 1, characterized in that the take-off knife (19) is secured to project upward from a location closer to the bottom of the trough (4) when a dipping angle is desired which is less than said maximum dipping angle obtainable when the take-off knife is secured adjacent an upper edge of the trough.

4. A method as defined in claim 3, characterized in that the filter cake (23) taken off by the take-off knife (19) is discharged through an aperture (17,18,21) located in the bottom of the trough (4) before the knife (19), seen in the direction of movement of the rotating vacuum filter.

5. A device for filtering a suspension, for example of yeast or other plant cell material, on a rotary vacuum filter (10) comprising a drum (12) and beneath the same a trough (4) for the suspension and a take-off knife (1, 19) for descaling the filter cake resulting from the filtering together with a thin layer of a precoat layer, characterized in that the take-off knife (1,19) is removably secured to the trough (4), a feeding device supports the trough (4) and is operable to move at least that portion of the trough (4) which carries the take-off knife (1, 19) in the direction toward the centre of the drum (12) during rotation of the drum; and that means (5; 25-27) are provided in said trough for maintaining the suspension level, in the trough, constant during movement of the trough and only a small distance below the take-off knife whereby only a small peripheral portion of the drum is not used for dipping and drying.

6. A device as defined in claim 5, characterized in that the take-off knife (1,19) is secured adjacent one upper edge of the trough (4).

7. A device as defined in claim 5, characterized by means defining a plurality of elongate apertures extending parallel to the drum axis and located in spaced apart relationship from a location adjacent an upper edge of the trough to a location adjacent the bottom of the trough; said take-off knife being selectively secured in any one of said apertures dependent on a desired dipping angle; and cover means provided for selectively closing those apertures in said trough other than that aperture in which said take-off knife is secured.

8. A device as defined in claim 7, characterized in that each said aperture is of such a size that a filter cake, taken off by said take-off knife located in a selected aperture, is caused to be discharged through said selected aperture.

* * * * *

UNITED STATES PATENT AND TRADEMARK OFFICE
CERTIFICATE OF CORRECTION

PATENT NO. : 4,521,314
DATED : June 4, 1985
INVENTOR(S) : Lundin et al.

It is certified that error appears in the above-identified patent and that said Letters Patent is hereby corrected as shown below:

Column 1, line 44, change "this" to --thus--.

Column 2, line 24, change "ridigly" to --rigidly--.

Column 2, line 26, change "ridigly" to --rigidly--.

Column 2, line 52, change "rididly" to --rigidly--.

Signed and Sealed this

Tenth Day of September 1985

[SEAL]

Attest:

DONALD J. QUIGG

Attesting Officer   Acting Commissioner of Patents and Trademarks - Designate